(12) United States Patent
Shiozawa

(10) Patent No.: US 8,243,568 B2
(45) Date of Patent: Aug. 14, 2012

(54) OPTICAL DISC APPARATUS

(75) Inventor: Manabu Shiozawa, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 195 days.

(21) Appl. No.: 12/622,156

(22) Filed: Nov. 19, 2009

(65) Prior Publication Data

US 2010/0202259 A1 Aug. 12, 2010

(30) Foreign Application Priority Data

Feb. 12, 2009 (JP) ................................. 2009-029299

(51) Int. Cl.
*G11B 20/10* (2006.01)
(52) U.S. Cl. ....... 369/47.5; 369/53.26; 369/94; 369/116
(58) Field of Classification Search .................. 369/47.5, 369/53.26, 94, 116
See application file for complete search history.

(56) References Cited

U.S. PATENT DOCUMENTS

| | | |
|---|---|---|
| 2004/0052186 A1 | 3/2004 | Yano et al. |
| 2006/0153051 A1 | 7/2006 | Kikukawa et al. |
| 2008/0298187 A1* | 12/2008 | Wada ........................... 369/47.5 |
| 2009/0109809 A1* | 4/2009 | Kuroda et al. ............. 369/44.23 |
| 2010/0202260 A1* | 8/2010 | Wu et al. ...................... 369/47.5 |

FOREIGN PATENT DOCUMENTS

| | | |
|---|---|---|
| CN | 1498400 A | 5/2004 |
| CN | 1816850 A | 8/2006 |
| JP | 2006-244658 | 9/2006 |
| JP | 2007-141319 | 6/2007 |
| JP | 2008-084504 | 4/2008 |

OTHER PUBLICATIONS

China State Intellectual Property Office (SIPO) office action for SIPO patent application CN200910211710.8 (Mar. 18, 2011).

* cited by examiner

*Primary Examiner* — Wayne Young
*Assistant Examiner* — Brenda Bernardi
(74) *Attorney, Agent, or Firm* — Kilpatrick Townsend & Stockton LLP

(57) ABSTRACT

An optical disc apparatus for recording or reproducing on or from an optical disc, comprising a laser light source for emitting a laser beam; a drive portion for driving the laser light source; a detection portion for detecting the emission power of the laser beam; and means for focusing the laser beam onto the optical disc, wherein information is reproduced by a reproducing power varied according to a recording power to obtain reproducing signals having necessary quality while suppressing deterioration of the recording quality due to the reproducing power.

6 Claims, 3 Drawing Sheets ized by a shorter wavelength and an increased numerical aperture. But, as future means for provision of a large capacity, it is assumed difficult to provide the laser with a much shorter wavelength. It is because polycarbonate which is one of main materials of the optical disc is deteriorated by the light in an ultraviolet region.

OPTICAL DISC APPARATUS

INCORPORATION BY REFERENCE

The present application claims priority from Japanese application JP2009-29299 filed on Feb. 12, 2009, the content of which is hereby incorporated by reference into this application.

BACKGROUND OF THE INVENTION

The present invention relates to an optical disc apparatus for playing an optical disc having plural recording layers.

As prior art, there are, for example, prior documents, Japanese Patent Laid-Open No. 2006-244658 (JP-A-2006-244658) and Japanese Patent Laid-Open No. 2008-84504 (JP-A-2008-84504).

SUMMARY OF THE INVENTION

Recently, a Blu-ray Disc (hereinafter referred to as BD) is attracting attention as a medium capable of recording large volumes of digital data. The BD is achieved to have a recording capacity of 25 GB per layer by using blue laser having a wavelength of 405 nm and a lens having a numerical aperture of 0.85. Since a spot diameter of the laser on the disc is proportional to the laser wavelength, the capacity was conventionally made large by providing the laser with a shorter wavelength and an increased numerical aperture. But, as future means for provision of a large capacity, it is assumed difficult to provide the laser with a much shorter wavelength. It is because polycarbonate which is one of main materials of the optical disc is deteriorated by the light in an ultraviolet region.

Therefore, there is proposed a technology to increase recording layers as means for increasing a recording capacity of one disc, and a two-layer disc has been put to practical use. To provide a much larger capacity in future, a multilayer disc having three, four or more recording layers is expected to be standardized.

The above-described document JP-A-2006-244658 discloses means for recording with stable recording quality on the optical disc having three or more recording layers.

The document JP-A-2008-84504 discloses means for switching a high-frequency amplitude and frequency superimposed with a reproducing laser beam to switch the layers of a multilayer optical disc for a problem that recording quality is deteriorated by a laser power at the time of reproduction.

One of problems when an optical disc having plural recording layers is reproduced is degradation of reproduction quality due to lowering of the reflectance of the recording layers. This problem can be remedied by means that increases reproducing power to increase the amplitude of the reproducing signal. But, a recordable optical disc has a problem that recorded data is deteriorated when the reproducing power is simply increased.

The present invention provides an optical disc apparatus to obtain a reproducing signal having necessary quality while suppressing the recording quality from being deteriorated by the reproducing power.

The present invention is made to solve the above described problems by, for example, the embodiments described below but is not limited to them.

The present invention provides a reproducing signal having necessary quality without deteriorating the quality of recorded data.

Other objects, features and advantages of the invention will become apparent from the following description of the embodiments of the invention taken in conjunction with the accompanying drawings.

DESCRIPTION OF THE EMBODIMENTS

Examples of the invention will be described below with reference to the drawings.

It should be noted that "reproducing power" and "recording power" used below indicate the power of laser beam focused on an optical disc at the time of reproducing and recording. And, "emission power" indicates the power of laser beam emitted by a laser diode.

Examples

Figure 1:
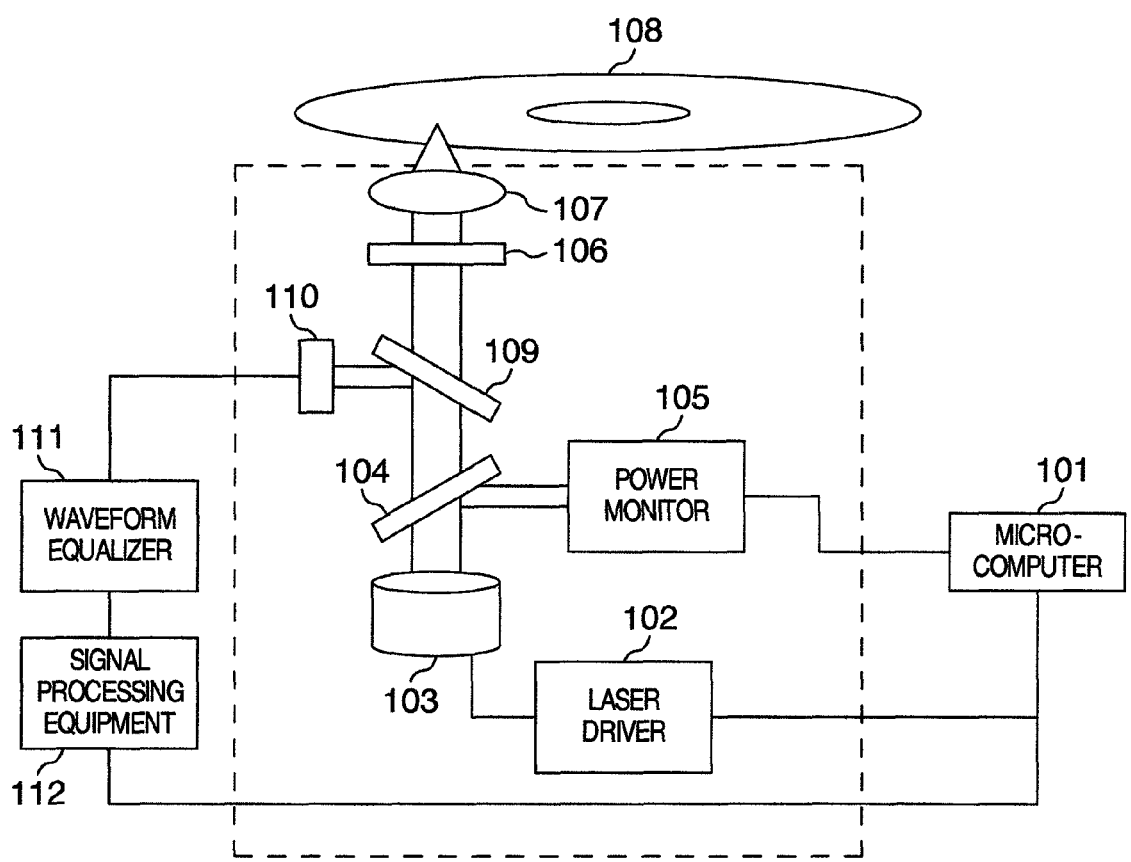
FIG. 1 is a diagram showing one example of an optical disc apparatus according to the invention.

FIG. 1 is a block configuration diagram showing one example of the optical disc apparatus according to the invention. Blocks not directly related the invention are omitted.

A microcomputer 101 communicates with a host device such as PC via an interface such as ATAPI. The microcomputer 101 performs light emission control of a laser driver 102, and the laser driver 102 outputs current to drive a laser diode 103 according to the control by the microcomputer 101. The laser diode 103 emits light with the emission power corresponding to drive current of the laser driver 102. A power monitor 105 detects the emission power of the laser diode 103 via a beam splitter 104, converts the detected power to a voltage value and outputs the voltage value to the microcomputer 101. A ¼ wavelength plate 106 changes a polarization direction by changing the phase of the laser transmitted through the beam splitter 104 by a ¼ wavelength. An objective lens 107 focuses the laser on an optical disc 108. The example of FIG. 1 shows blocks 102 to 107, 109, 110 in a frame indicated by a dotted line, which are mounted on an optical pickup. FIG. 1 shows an example that the laser diode 103 and the power monitor 105 are separately mounted, but there may be used a laser diode that a power monitor is packaged and the detected power is outputted to the microcomputer 101. It is because space saving and control may be facilitated in view of designing of the pickup.

The laser reflected on the optical disc 108 includes the information of the disc as a change in light intensity. To perform reproduction, the laser reflected on the optical disc 108 is changed its polarization direction by the ¼ wavelength plate 106. The laser is reflected by a polarized beam splitter 109 and focused on a detector 110. The detector 110 detects the focused laser, and outputs a signal corresponding to the laser intensity to a waveform equalizer 111. The waveform equalizer 111 performs processing such as equalization, amplification or the like of the signal waveform detected by the detector 110 and outputs the result to signal processing equipment 112. The signal processing equipment 112 performs signal processing such as analogue/digital conversion, equalization, decoding or the like on the signal waveform outputted by the waveform equalizer 111 and outputs the decoded data to the microcomputer 101.

To perform recording, the data pattern determined by the microcomputer 101 is outputted to the laser driver 102, and the laser driver 102 outputs drive current corresponding to the data pattern to the laser diode 103. The laser diode 103 outputs the laser having an emission waveform corresponding to the drive current and focuses the laser on the optical disc 108 through the objective lens 107 to perform recording. The current to drive the laser diode 103 may be outputted by the microcomputer 101.

Figure 2:
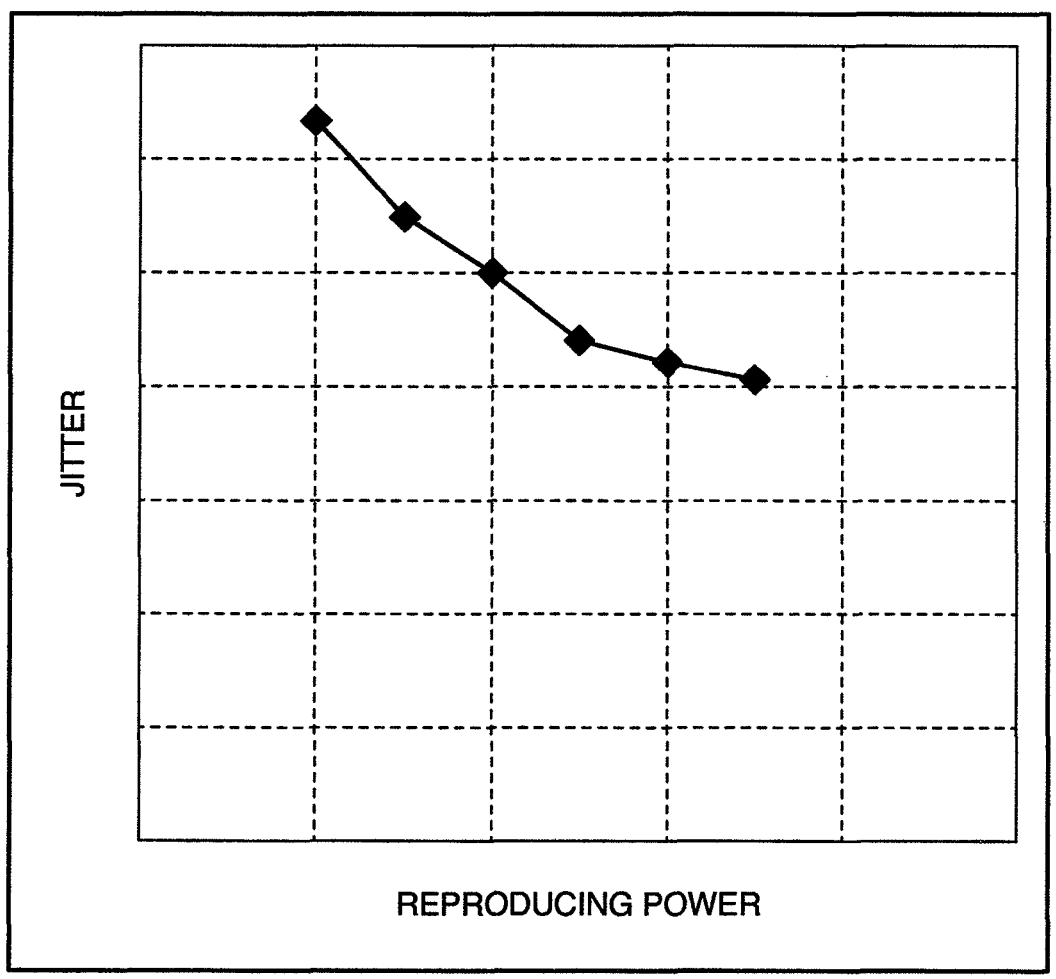
FIG. 2 is a diagram showing a relation between reproducing power and jitter.

FIG. 2 is a diagram showing a change in jitter to the reproducing power when an optical disc is reproduced. The jitter is an index to characterize the reproduction quality, indicating that the reproduction quality is better as the jitter is lower. It is seen from FIG. 2 that the jitter lowers as the reproducing power becomes higher. Especially, an optical disc having plural recording layers has this tendency conspicuous because a reproducing signal has a small amplitude. But, a recordable optical disc has a problem that the recorded data is deteriorated when the reproducing power is increased. This data deterioration depends on the characteristics of the recording layers and varies depending on the recording layers.

In this embodiment, the reproducing power varies depending on the recording layers and can be made maximum in a range not deteriorating the recorded data to improve the reproduction performance. The reproducing power may be determined by the method described in the followings or may have a predetermined value.

The reproducing power may also be determined for individual types of optical discs.

A method of determining the reproducing power based on the recording power is described below.

Figure 3:
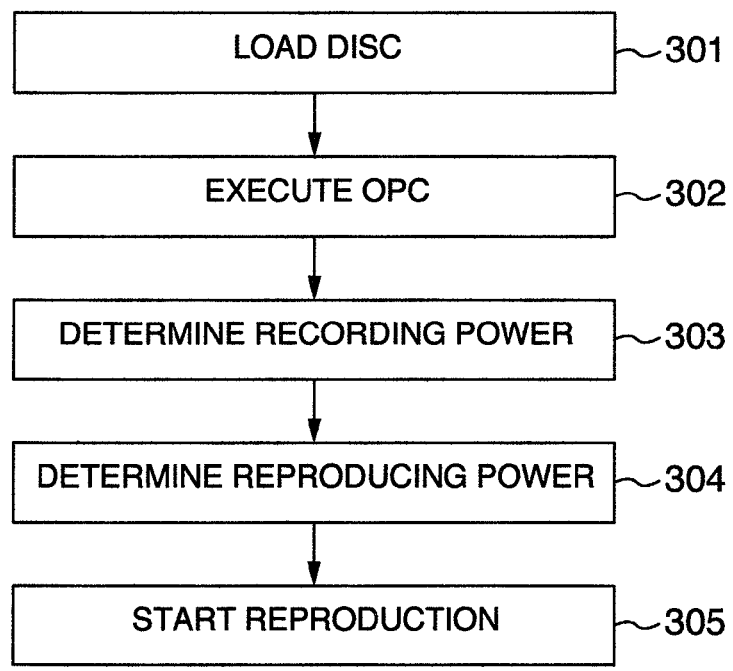
FIG. 3 is a flow chart from loading to reproduction of a disc by the optical disc apparatus according to the invention.

FIG. 3 is a flow chart showing an example procedure from loading to start of reproduction of an optical disc by the optical disc apparatus according to the invention. Operations not directly related to the present invention are omitted.

The disc is loaded in step 301. After control is started on a focus servo and a tracking servo, OPC (Optimum Power Control) is performed at a prescribed position on the optical disc in step 302. This is a trial write operation for determining optimum recording power of the optical disc, and it is known to use κ-OPC and β-OPC for that. The OPC performs the trial writing while changing recording conditions (such as recording power and a record pulse width) and reproduces trial write data to determine optimum recording conditions. The reproducing power for reproduction of the trial write data may be a reproducing power which is predetermined by a recording/reproducing device or a recommended reproducing power recorded on the optical disc. After the recording power is determined in step 303, the reproducing power is determined based on the recording power in step 304. The determined reproducing power is used to start reproduction in step 305. The reproducing power determined as described above may be recorded in the recording/reproducing device or on the optical disc. It can also be used as reproducing power when the trial write data is reproduced by the next OPC.

Figure 4:
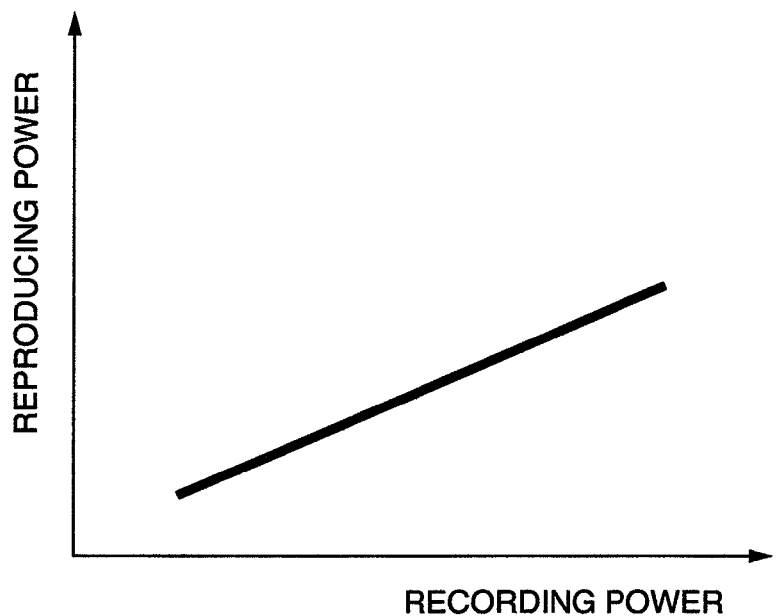
FIG. 4 is a diagram showing a relation between recording power and reproducing power.

A method of determining the reproducing power based on the recording power is described below. FIG. 4 is an example graph of a relational expression between the recording power and the reproducing power, and the reproducing power is determined based on the relational expression shown in the drawing. Generally, an optical disc having optimum recording power in a low area has a high sensitivity to the laser power. Such an optical disc has a tendency that the recorded data is deteriorated by the laser, so that it is also necessary to use the reproducing power having a low value. Meanwhile, an optical disc having the recording power in a high area has a low sensitivity to the laser power. Thus, the reproduction performance can be improved by increasing the reproducing power to increase an S/N ratio.

As shown in FIG. 4, this example shows a relation between the recording power and the reproducing power is represented by a linear function but can also be applied when a relational expression between the recording power and the reproducing power can be represented by a quadratic, cubic or more function.

The method of determining the reproducing power based on the recording power determined by the OPC was described above. But, the reproducing power may be determined based on a recommended recording power or a recommended reproducing power previously recorded on the optical disc. In other words, when the relation between the recording power and the reproducing power shown in FIG. 4 is justified, the reproducing power is determined from the recommended recording power recorded on the optical disc based on the relational expression as shown in FIG. 4, and reproduction may be performed by this reproducing power. In this case, it is not necessary to perform the OPC, so that the time from loading of the optical disc to becoming a replayable state can be shortened. This method is particularly effective when recording is not performed.

For example, in a case where the optimum recording power determined by the OPC are previously recorded on a optical disc in addition to the recommended recording power prerecorded on the optical disc, the reproducing power may be calculated from the recommended reproducing power recorded on the optical disc based on a ratio between the recommended recording power and the optimum recording power.

It was described in the above example that the reproducing power is determined from the recording power by the recording/reproducing device on which the OPC can be performed. The same manner can also be applied to a case where the reproducing power is determined by a playback-only optical disc apparatus. To reproduce a playback-only optical disc, the playback-only optical disc apparatus does not determine the reproducing power based on the recording power but performs reproduction based on a prescribed reproducing power. Meanwhile, to reproduce a recordable optical disc, on which information is recorded, by the recording/reproducing device, the reproducing power is determined based on the recording power recorded on the optical disc. As the recording power, at least either the recommended recording power or the optimum recording power which is obtained by performing the OPC by the recording/reproducing device shall be recorded on the recordable optical disc. In the playback-only optical disc apparatus, the relation between the recording power and the reproducing power is recorded as a formula or a table in the storage portion. The playback-only optical disc apparatus may read the recommended recording power and the optimum recording power according to the OPC from the recordable optical disc to determine the reproducing power from the relation between the recording power and the reproducing power recorded in the storage portion.

When a multilayer optical disc has three-, four- or more recording layers, a relation between the recording power and the reproducing power with respect to each recording layer may be stored in the storage portion or a relation between the recording power and the reproducing power with respect to a given recording layer may be stored as reference data in the storage portion, and the reproducing power may be decided according to the reference data when another recording layer is reproduced.

When the recording power is varied according to a position on the optical disc depending on a state of the recording layer, the reproducing power may be determined according to the position on the optical disc based on the relation between the predetermined recording power and reproducing power. When a temperature change of the laser is taken into consideration, if the recording power is varied, it is not necessary to vary the read power accordingly, but the upper limit value of the read power may be determined to adjust the read power in a range not exceeding the upper limit value.

By determining the reproducing power according to the recording power as described above, the maximum reproducing power can be used in a region not deteriorating the quality of the recorded data, thereby reproduction can be performed finely.

According to the above-described method, data can be reproduced with good reproduction quality from a recordable optical disc whose recording density per 1 recording layer is further increased or a recordable optical disc whose number of recording layers is further increased from two layers to three, four, five or more recording layers, without deteriorating the quality of data recorded on the recordable optical disc.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus for recording or reproducing on or from an optical disc, comprising:
   a laser light source which emits a laser beam;
   a drive portion which drives the laser light source;
   a detection portion which detects the emission power of the laser beam;
   means which focuses the laser beam onto the optical disc;
   an optical receiving portion which receives the laser beam reflected by the optical disc; and
   a microcomputer which reads data from a signal outputted from the optical receiving portion and controls operations of the optical disc apparatus, wherein:
   the microcomputer reads a recommended recording power and a recommended reproducing power from the optical disc, and calculates the reproducing power from the recommended reproducing power and a ratio of an optimum recording power determined by performing optimum power control to the recommended recording power.

2. The optical disc apparatus according to claim 1, wherein the microcomputer controls reproduction with a prescribed reproducing power when the optimum power control is executed.

3. The optical disc apparatus according to claim 2, wherein the reproducing power when the optimum power control is executed is a reproducing power predetermined in the optical disc apparatus or a recommended reproducing power recorded on the optical disc.

4. A method of reproducing an optical disc, comprising:
   emitting a laser beam from a laser light source;
   driving the laser light source;
   detecting emission power of the laser beam;
   focusing the laser beam onto the optical disc;
   receiving the laser beam reflected by the optical disc;
   reading a recommended recording power and a recommended reproducing power from the optical disc;
   determining an optimum recording power by performing optimum power control; and
   calculating the reproducing power from the recommended reproducing power and a ratio of the optimum recording power to the recommended recording power.

5. The method of reproducing an optical disc according to claim 4, wherein the reproduction is performed by a prescribed reproducing power when the optimum power control is performed.

6. The method of reproducing an optical disc according to claim 5, wherein the reproducing power when the optimum power control is performed is a reproducing power previously set in the recording/reproducing device or the recommended reproducing power recorded on the optical disc.

* * * * *

UNITED STATES PATENT AND TRADEMARK OFFICE
CERTIFICATE OF CORRECTION

PATENT NO. : 8,243,568 B2  
APPLICATION NO. : 12/622156  
DATED : August 14, 2012  
INVENTOR(S) : Manabu Shiozawa It is certified that error appears in the above-identified patent and that said Letters Patent is hereby corrected as shown below:

Title Page:

In the bibliographic data at (73) Assignee,

"Hitachi-LG Data Storage, Inc., Tokyo (JP)"

should read,

-- Hitachi, Ltd., Tokyo (JP); Hitachi-LG Data Storage, Inc., Tokyo (JP) --

Signed and Sealed this  
Twentieth Day of November, 2012

David J. Kappos  
*Director of the United States Patent and Trademark Office*